(12) United States Patent
Kwon

(10) Patent No.: US 7,899,081 B2
(45) Date of Patent: Mar. 1, 2011

(54) METHOD AND APPARATUS FOR TRANSCEIVING DATA

(75) Inventor: Seong Geun Kwon, Daegu Metropolitan (KR)

(73) Assignee: Samsung Electronics Co. Ltd, Suwon-Si (KR)

( * ) Notice: Subject to any disclaimer, the term of this patent is extended or adjusted under 35 U.S.C. 154(b) by 124 days.

(21) Appl. No.: 12/131,363

(22) Filed: Jun. 2, 2008

(65) Prior Publication Data

US 2009/0010281 A1    Jan. 8, 2009

(30) Foreign Application Priority Data

Jul. 3, 2007    (KR) ..................... 10-2007-0066433

(51) Int. Cl.
*H04J 4/00*    (2006.01)
(52) U.S. Cl. .................. 370/478; 370/343; 370/432; 370/436; 370/380
(58) Field of Classification Search ............... 370/380, 370/432, 343
See application file for complete search history.

(56) References Cited

U.S. PATENT DOCUMENTS

| | | | |
|---|---|---|---|
| 7,583,584 B2* | 9/2009 | Wang et al. ............. | 370/206 |
| 2002/0078446 A1* | 6/2002 | Dakss et al. ............. | 725/37 |
| 2002/0091771 A1* | 7/2002 | Agraharam et al. ....... | 709/205 |
| 2004/0005018 A1 | 1/2004 | Zhu et al. | |
| 2005/0068977 A1* | 3/2005 | Na et al. ................. | 370/432 |
| 2006/0215538 A1 | 9/2006 | Murthy et al. | |
| 2007/0036065 A1 | 2/2007 | Wang | |
| 2007/0081484 A1 | 4/2007 | Wang | |
| 2007/0082696 A1 | 4/2007 | Wang | |
| 2007/0211168 A1* | 9/2007 | Ko et al. ................. | 348/462 |

FOREIGN PATENT DOCUMENTS

WO    2004/008706 A2    1/2004

* cited by examiner

*Primary Examiner*—Dang T Ton
*Assistant Examiner*—Pamit Kaur
(74) *Attorney, Agent, or Firm*—Jefferson IP Law, LLP

(57) ABSTRACT

A method and apparatus for transceiving additional data using unallocated slots of a header of a frame used in a broadcast system are provided. A data transceiving apparatus includes a data transmitter for encoding, modulating, and transmitting a broadcast frame including a first region containing broadcast data and a second region containing additional data and a data receiver for receiving the broadcast frame, extracting at least any of the broadcast data and the additional data from the broadcast frame, and processing the broadcast data and the additional data independently.

23 Claims, 5 Drawing Sheets

METHOD AND APPARATUS FOR TRANSCEIVING DATA

PRIORITY

This application claims the benefit under 35 U.S.C. §119(a) of a Korean patent application filed in the Korean Intellectual Property Office on Jul. 3, 2007 and assigned Serial No. 2007-0066433, the entire disclosure of which is hereby incorporated by reference.

BACKGROUND OF THE INVENTION

1. Field of the Invention

The present invention relates to a data transceiver. More particularly, the present invention relates to a method and apparatus for transceiving additional data using unallocated slots in a broadcast system such as Media Forward Link Only (MediaFLO).

2. Description of the Related Art

Mobile phones have become very popular communication devices due to their ease of portability and mobility. Recently, mobile phones have been produced having various multimedia modules and functions integrated therein. Examples of such integrated functions include an MP3 function, a broadcast playback function, a video playback function, and a camera function. Notably, these functions have been integrated into the mobile phone while maintaining its portability.

Among these multimedia functions, the broadcast playback function can be implemented with a distinct broadcast receiver module corresponding to the broadcast system. For example, the mobile terminal may be equipped with a DMB module for receiving broadcast data of a Digital Multimedia Broadcast (DMB) system or a DVB-H module for receiving broadcast data of a Digital Video Broadcast-Handheld (DVB-H) system. MediaFLO is a new technology for broadcasting data to portable devices. MediaFLO enables the convergence of broadcast and wireless technologies to provide business opportunities throughout the mobile broadcast ecosystem. However, since the MediaFLO technology has been developed and proposed after the other broadcast technologies, a precise specification for deployment is not yet prepared. Accordingly, there is a need for the development of various service delivery methods and systems based on the MediaFLO technology.

SUMMARY OF THE INVENTION

An aspect of the present invention is to address the above-mentioned problems and/or disadvantages and to provide at least the advantages described below. Accordingly, as aspect of the present invention is to provide a method and apparatus for transmitting additional data using an unallocated area of a broadcast frame in addition to the broadcast data.

In accordance with an aspect of the present invention, a data transmission apparatus is provided. The apparatus includes a frame generator for generating a broadcast frame including a first region for containing broadcast data and a second region for containing additional data and a transmitter for encoding, modulating, and transmitting the broadcast frame.

In accordance with another aspect of the present invention, a data reception apparatus is provided. The data reception apparatus includes a broadcast reception module for receiving a broadcast frame and a control unit for extracting broadcast data and additional data from the broadcast frame and for processing, when the additional data is detected, the additional data independently.

In accordance with yet another aspect of the present invention, a data transceiving apparatus is provided. The transceiving apparatus includes a data transmitter for encoding, modulating, and transmitting a broadcast frame including a first region containing broadcast data and a second region containing additional data and a data receiver for receiving the broadcast frame, for extracting at least any of the broadcast data and the additional data from the broadcast frame, and for processing the broadcast data and the additional data independently.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and phrases used in the specification and appended claims are provided to enable a clear and consistent understanding of the detailed description and the claims.

Unless otherwise noted, the terms and phrases are to be understood according to conventional usage by those skilled in the relevant art. While the invention is shown and described with reference to certain exemplary embodiments thereof, it will be understood by those skilled in the art that various changes in form and details may be made therein without departing from the spirit and scope of the invention as defined by the appended claims and their equivalents.

Although the method and apparatus for transceiving additional data is described in association with a MediaFLO system in the following examples, the present invention is not limited thereto. For example, the method and apparatus for transceiving additional data can be applied to any broadcast system that uses a frame structure having space in addition to a field carrying broadcast data. Accordingly, the data transceiver according to exemplary embodiments of the present invention should be understood as a communication technology that uses a frame structure for transmitting broadcast data and additional information data.

Although the method and apparatus for transceiving data is adapted to a MediaFLO-enabled mobile terminal in the following description, the present invention is not limited thereto. For example, the method and apparatus for transceiving data can be applied to any of, as a device having a MediaFLO module, a cellular phone, a digital broadcast receiver, a Personal Digital Assistant (PDA), a Smartphone, a 3rd Generation (3G) mobile communication terminals including Universal Mobile Telecommunication Service (i.e., Wideband Code Division Multiple Access: WCDMA) and High Speed Downlink Packet Access (HSDPA), and their equivalents.

Figure 1:
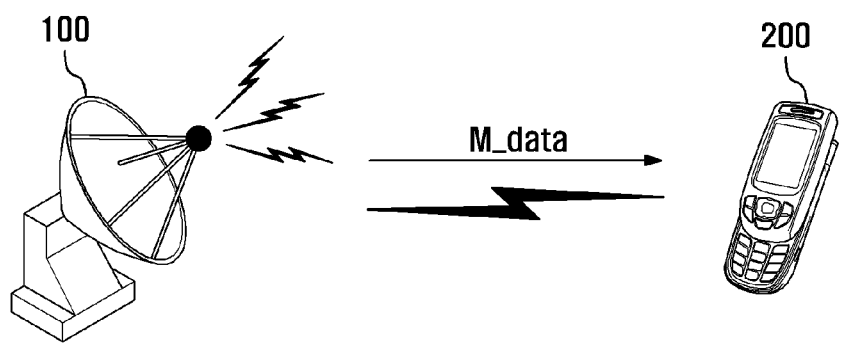
FIG. 1 is a schematic diagram illustrating a MediaFLO broadcast system using a data transceiving method according to an exemplary embodiment of the present invention.

FIG. 1 is a schematic diagram illustrating a MediaFLO broadcast system using a data transceiving method according to an exemplary embodiment of the present invention.

As illustrated in FIG. 1, the MediaFLO broadcast system includes a broadcast station 100 for broadcasting broadcast data and additional data (M_data) and at least one mobile terminal 200 for receiving the broadcast data and the additional data (M_data) broadcast by the broadcast station 100.

The broadcast station 100 creates the broadcast data and the additional data (M_data), encapsulates the broadcast data and the additional data in a MediaFLO-based frame structure, and broadcasts the frame. The broadcast station 100 generates the additional data (M_data) and inserts the additional data (M_data) into a region to which no broadcast data is allocated in the frame. The operation of the MediaFLO is described in more detail below with reference to the drawings. When there is no request for additional data (M_data), the broadcast station 100 can transmit the frame containing the broadcast data without any additional data (M_data).

Figure 2:
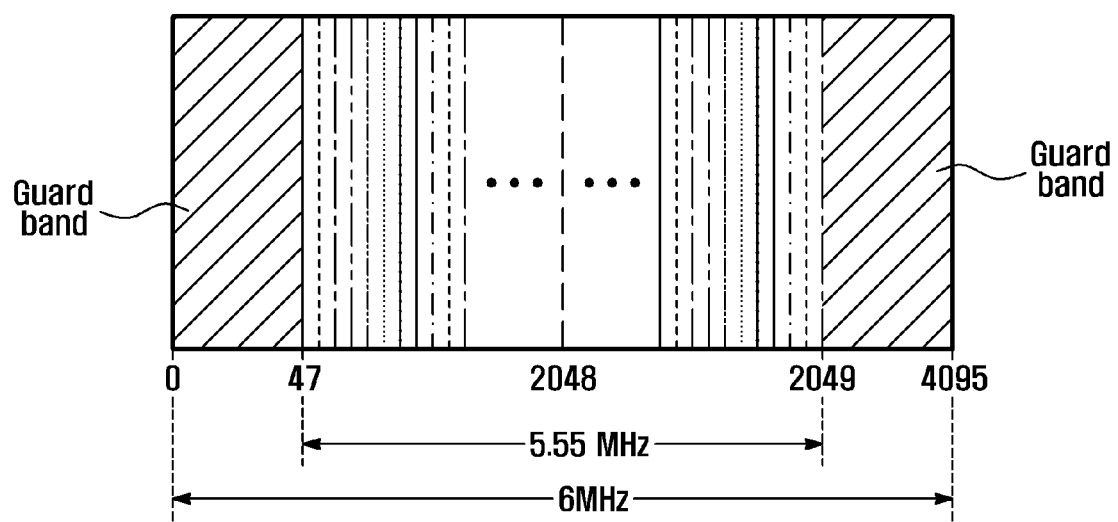
FIG. 2 is a diagram illustrating an Orthogonal Frequency Division Multiplexing (OFDM) symbol used in the MediaFLO system of FIG. 1 according to an exemplary embodiment of the present invention.

FIG. 2 is a diagram illustrating an Orthogonal Frequency Division Multiplexing (OFDM) symbol used in the MediaFLO system of FIG. 1 according to an exemplary embodiment of the present invention.

In the MediaFLO system, each super frame consists of 200 OFDM symbols per MHz of allocated bandwidth (e.g. 1200 symbols for 6 MHz).

Referring to FIG. 2, a 6 MHz bandwidth consists of guard bands formed on either side of the super frame and subcarriers interposed between the guard bands. Each guard band occupies 0.225 MHz for a total of 0.45 MHz (left guard band of 0.225 MHz and right guard band of 0.225 MHz) being allocated for guard bands. Accordingly, the subcarriers span a bandwidth of 5.55 MHz.

In a case of using 4096 subcarriers for the 6 MHZ bandwidth, a total of 4000 subcarriers for the bandwidth of 5.55 MHz are used for transmitting and receiving data. The 4000 subcarriers are aligned in a repeated interval of eight subcarriers but not in a consecutive manner. Such a non-consecutive alignment achieves a noise-robust characteristic. That is, following the left-side guard band, the consecutive signals modulated with the subcarriers are arranged in an interval of eight subcarriers. Consequently, the subcarriers are equally divided into eight disjointed groups and each group consists of 500 subcarriers. Here, the group is called a slot and the slots are allocated the broadcast data and the additional data (M_data). The slot allocation mechanism is described in more detail with reference to FIG. 4 below.

Figure 3:
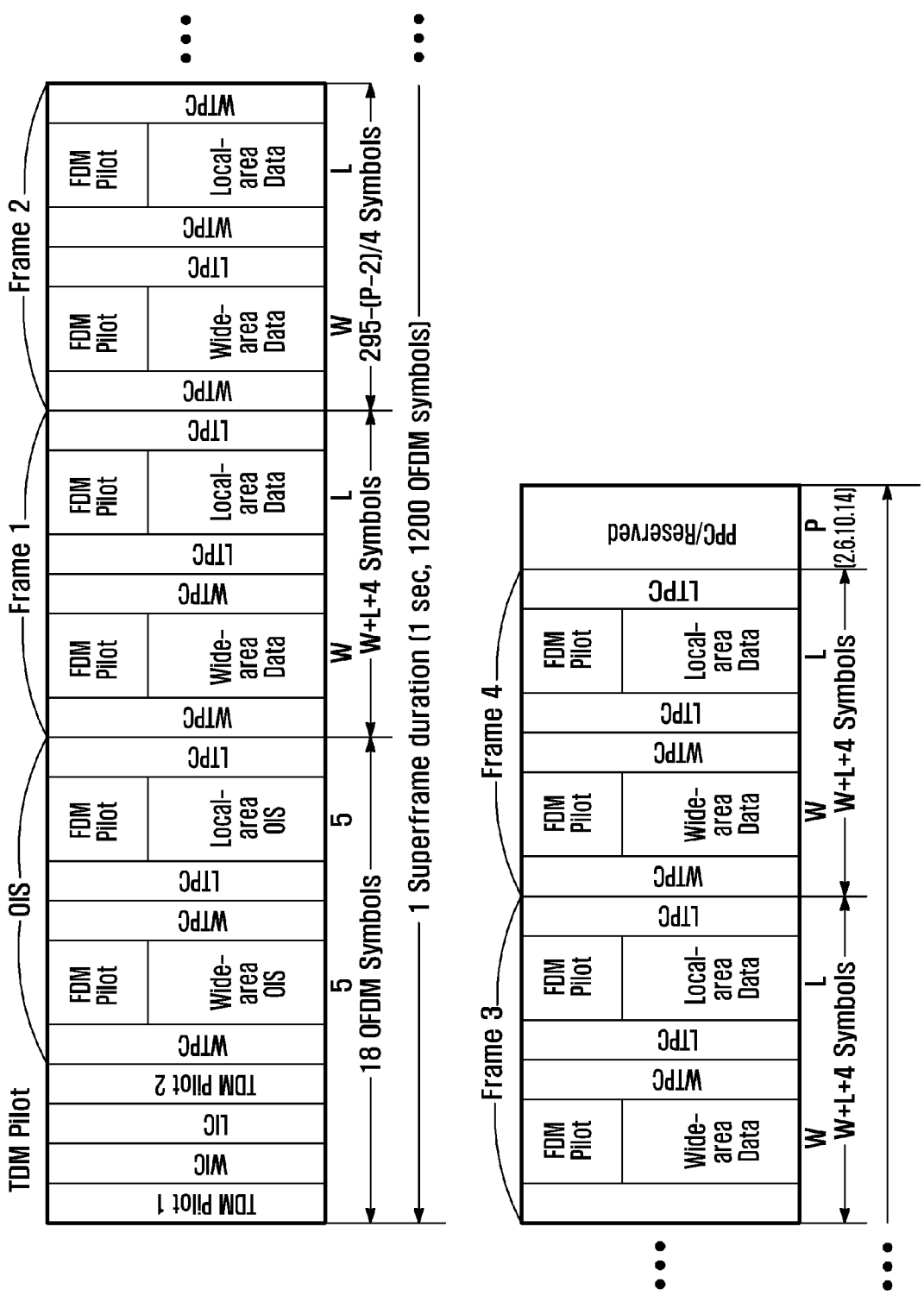
FIG. 3 is a diagram illustrating a structure of a super frame of the MediaFLO system of FIG. 1 according to an exemplary embodiment of the present invention.

FIG. 3 is a diagram illustrating a structure of a super frame of the MediaFLO system of FIG. 1 according to an exemplary embodiment of the present invention.

Referring to FIG. 3, the super frame includes a Time Division Multiplexing (TDM) Pilot region, an Overhead Information Symbols (OIS) region, four frames, and a reserved region.

The TDM Pilot region includes a TDM Pilot 1, a Wide-area Identification Channel (WIC), a Local area identification channel (LIC), and a TDM Pilot 2. The TDM Pilot 1 is a first OFDM symbol indicating a start of the super frame. The WIC is used for identifying information about a wide area such as a Metropolitan area. The LIC is used for identifying information about a local area. The TDM Pilot 2 indicates the end of the TDM pilot region. As described above, the MediaFLO system uses a super frame containing broadcast data on the central as well as local broadcast and additional data.

The OIS region carries a System Parameter Message and overhead information. The OIS region includes a pair of Wide Transmission Pilot Channels (WTPC), a Frequency Division Multiplexing (FDM) Pilot, a Wide-area OIS, a pair of Local Transmission Pilot Channels (LTPC), and a Local-area OIS. The first WTPC indicates the start of the Wide-area OIS region, and the FDM pilot is a pilot region for channel estimation. The Wide-area OIS region contains system parameters for the central broadcast. The second WTPC indicates the end of the Wide-area OIS region. The first LTPC indicates the start of the Local-area OIS region containing the system parameters for the local broadcast, and the second LTPC indicates the end of the Local-area OIS region. The WTPC and LTPC are used to assist channel estimation for the Wide-area channels and Local-area channels and synchronization timing of the first MediaFLO Logical Channel (MLC) of each frame.

The TDM Pilot and OIS regions can be regarded as header information in view of the super frame. In a case where the super frame duration is matched with 1200 OFDM symbols, the header information corresponds to 18 OFDM symbols. In more detail, each of the TDM Pilot 1, WIC, LIC, and TDM Pilot 2 corresponds to one OFDM symbol duration, and each of the WTPC and LTPC corresponds to one symbol duration as well. The first FDM Pilot or Wide-area OIS region and the first FDM Pilot or Local-area OIS region correspond to five OFDM symbol durations, respectively.

The four frames, i.e. Frame 1, Frame 2, Frame 3, and Frame 4, carry the broadcast data associated with the central and local broadcasts defined in the OIS region of the header. That is, each frame includes WTPCs, FDM Pilots, LTPCs, Wide-area Data, and Local-area Data fields. Here, the FDM Pilot and Wide-area Data can be transmitted through different slots in the same symbol duration.

The Positioning Pilot Channel (PPC), as a reserved region, is used for providing the mobile device with local information of the MediaFLO system. The PPC symbols can be defined in the OIS region.

As described above, the super frame consists of 1200 OFDM symbols and each OFDM symbol is divided into eight slots. The slot allocation of the super frame is described hereinafter.

Figure 4:
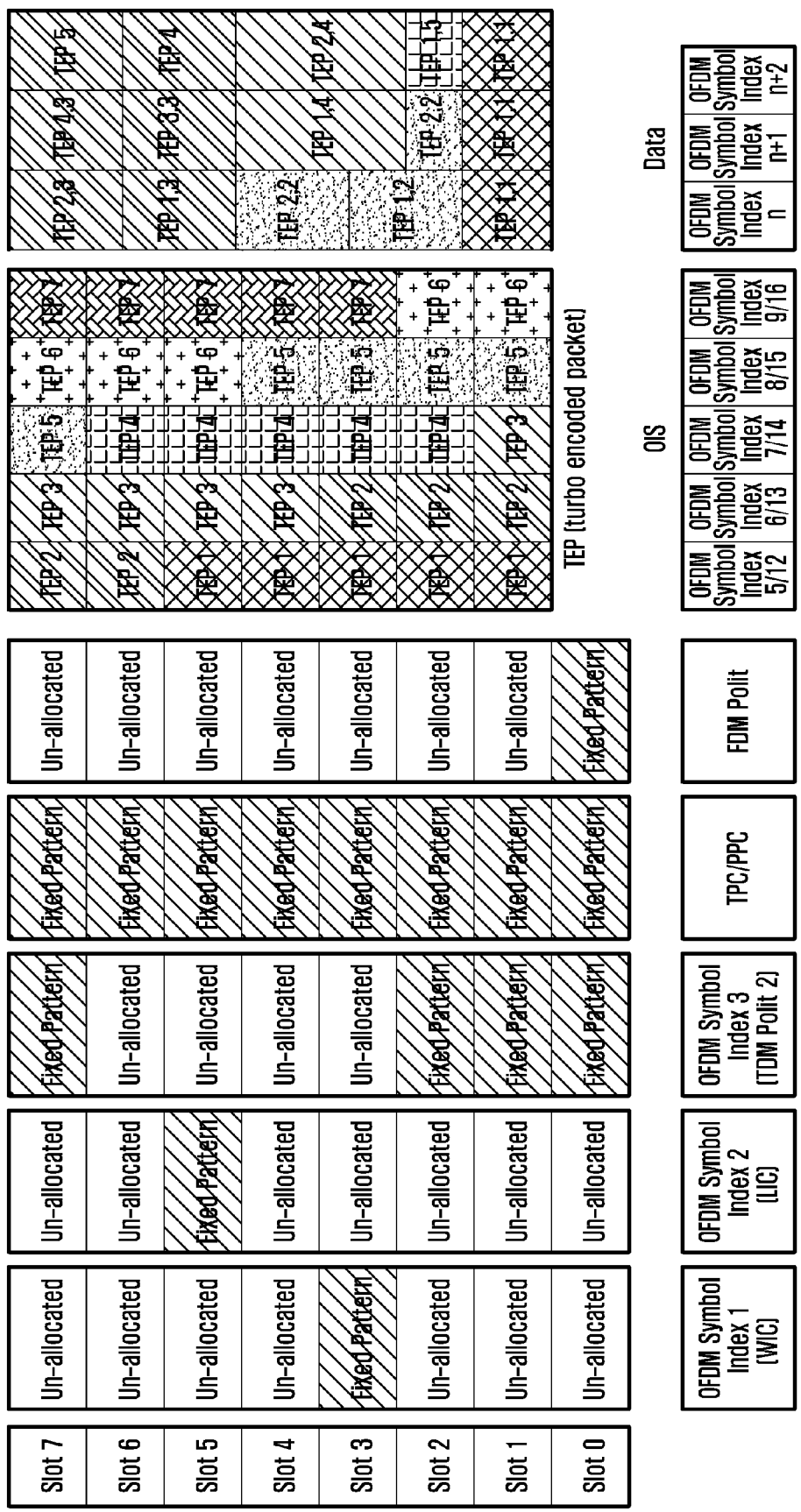
FIG. 4 is a diagram illustrating a slot allocation scheme of the MediaFLO system of FIG. 1 according to an exemplary embodiment of the present invention.

FIG. 4 is a diagram illustrating a slot allocation scheme of the MediaFLO system of FIG. 1 according to an exemplary embodiment of the present invention.

Referring to FIG. 4, the super frame is mapped to the eight slots, i.e. Slot 0, Slot 1, Slot 2, Slot 3, Slot 4, Slot 5, Slot 6, and Slot 7. In more detail, the WIC is allocated to Slot 3 of the first OFDM symbol duration indicated by OFDM symbol index 1. The LIC is allocated to Slot 5 of the second OFDM symbol duration indicated by OFDM symbol index 2. The TDM Pilot 2 is allocated to Slot 0, Slot 1, Slot 2, and Slot 7 of the third OFDM symbol duration indicated by OFDM system index 3. Next, the TCP/PPC is allocated to all the slots of the fourth OFDM symbol duration. Here, the FDM Pilot is allocated to Slot 0 in the same OFDM symbol duration as other frame data including Wide-area Data and Local-area Data. The OIS region is allocated the Slots 0 to 7 in the Turbo Encoded Packet (TEP) format.

As described above, in the slot allocation scheme defined in the MediaFLO system, the data of regions of the super frame except for the TDM Pilot region are allocated all slots of the OFDM symbols. In the case of the TDM Pilot region, each of WIC and LIC regions is allocated one slot such that the OFDM symbol allocated to each of the WIC and LIC has seven unallocated slots. Also, the OFDM symbol allocated to the TDM Pilot 2 has four empty slots. Bit numbers allocated for the TDM Pilot 1 are described with reference to a configuration of a broadcast system.

Figure 5:
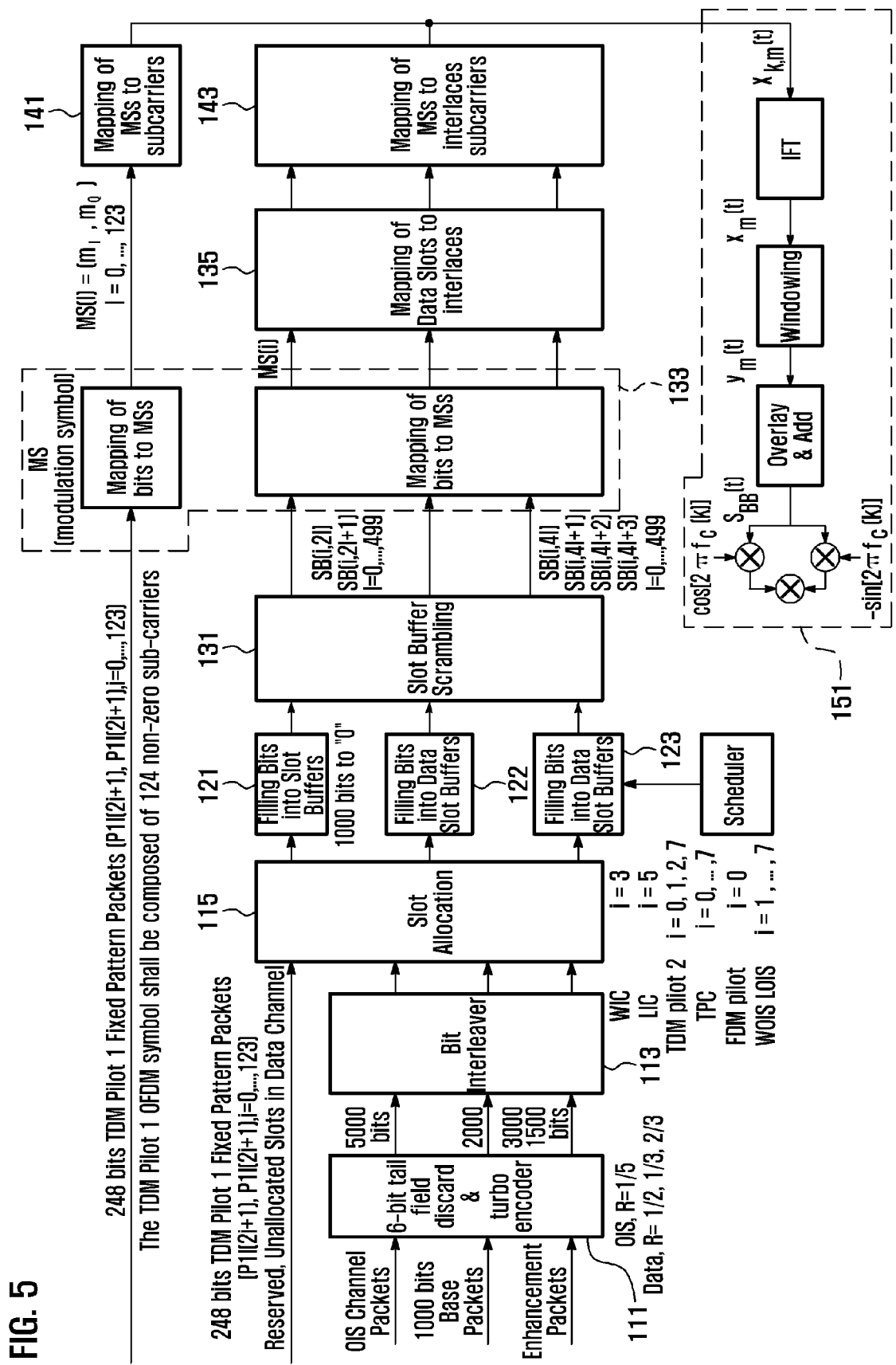
FIG. 5 is a block diagram illustrating a configuration of a system for transmitting broadcast data generated by a MediaFLO system according to an exemplary embodiment of the present invention.

FIG. 5 is a block diagram illustrating a configuration of a system for transmitting broadcast data generated by a MediaFLO system according to an exemplary embodiment of the present invention.

Referring to FIG. 5, the broadcast data transmission system includes an encoder 111, a bit interleaver 113, a slot allocator 115, a first slot buffer 121, a second slot buffer 122, a third slot buffer 123, a slot buffer scrambler 131, a bit mapper 133, a data slot interlace mapper 135, a subcarrier mapper 141, an interlace subcarrier mapper 143, and a transmitter 151.

The encoder 111 performs turbo encoding on the OIS channel packets, base packets included in a stream layer according to the MediaFLO system, and enhancement packets. The encoder 111 discards six bits of tail fields of the packets and then performs turbo encoding. The encoder 111 encodes the OIS channel packets at the rate of ⅕ and the base packets and enhancement packets at one of ½, ⅓, and ⅔ rates, selectively. The encoder 111 outputs the encoded data to the bit interleaver 113.

The bit interleaver 113 interleaves the encoded data according to a preset algorithm. The bit interleaver 113 can perform a two-dimensional interleaving on the data. That is, the bit interleaver 113 arranges the data to be interleaved in a two dimensional manner and performs interleaving in one of four directions once and then performs interleaving in another direction more than once. The interleaving can be performed in different order of the blocks constituting the two dimensional arrangements.

The slot allocator 115 allocates slots for the data of the WIC, LIC, TDM Pilot 2, FDM Pilot, and TPC, and the data interleaved by the bit interleaver 113 according to an algorithm of the MediaFLO system. Here, the data of the WIC, LIC, TDM Pilot 2, FDM Pilot, and TPC are directly delivered to the slot allocator 115 without passing the encoder 111 and bit interleaver 113. The slot allocator 115 allocates the slots for the information of the WIC, LIC, and TDM Pilot 2.

The first slot buffer 121 buffers the data allocated by the slot allocator 115. Here, the first slot buffer 121 buffers mainly the data corresponding to the WIC, LIC, TDM Pilot 2, FDM Pilot, and TCP. The first slot buffer 121 outputs the buffered data to the slot buffer scrambler 131.

The second slot buffer 122 performs buffering of the OIS channel packets in a similar manner to that of the first slot buffer 121. The second buffer 122 outputs the buffered data to the slot buffer scrambler 131.

The third slot buffer 123 performs buffering of the base packets and enhancement packets in a similar manner to that of the first and second slot buffers 121 and 122. The third slot buffer 123 outputs the buffered data to the slot buffer scrambler 131.

Of course, the first to third slot buffers 121, 122, and 123 can be configured for buffering other data rather than the data as designated above according to a design change.

The slot buffer scrambler 131 performs scrambling on the data output by the first to third slot buffers 121, 122, and 123. The slot buffer scrambler 131 scrambles the data according to a preset algorithm so as to prevent the data from being distorted or modified. The slot buffer scrambler 131 also allows the mobile terminal having a key corresponding to the scrambled variable value to receive the broadcast data.

The modulation bit mapper 133 maps the data output by the slot buffer scrambler 131 to modulation symbols. The modulation bit mapper 133 maps the 248 bits of the pattern packet fixed to the TDM Pilot 1 to the modulation symbols. The modulation bit mapper 133 outputs the bit values corresponding to the TDM Pilot 1 to the subcarrier mapper 141.

The data slot interlace mapper 135 performs data slot mapping for interlacing the bit values mapped by the modulation bit mapper 133. The data slot interlace mapper 135 outputs the mapped data slots to the interlace subcarrier mapper 143.

The interlace subcarrier mapper 143 applies the mapped data slots to the subcarriers and performs interleaving. Here, the term "interleaving" refers to the allocating of the consecutive data in units of eight subcarriers.

The subcarrier mapper 141 applies the value corresponding to the bit values corresponding to the TDM Pilot 1 among the data output by the modulation bit mapper 133.

The transmitter 151 broadcasts the signal output by the subcarrier mapper 141 and the interlace subcarrier mapper 143 according to a transmission scheme of the MediaFLO system such that the mobile terminal 200 receives the signal.

In the illustrated example, the slot allocator 115 receives the additional data (M_data) and maps the additional data (M_data) to specific slots. In more detail, the slot allocator 115 allocates the unallocated slots of the OFDM symbols designated for the WIC, LIC, and TDM Pilot 2. The additional data (M_data) is delivered to the transmitter 151 via the buffers 121 to 123, slot buffer scrambler 131, bit mapper 133, data slot interlace mapper 135, and subcarrier mapper 141 together with the WIC, LIC, and TDM Pilot 2 data. The additional data (M_data) includes the data created by the broadcast station 100 for a specific purpose, for example an advertisement created for a specific content provider, an alarm message, mobile terminal update information and the like.

The modulation bit mapper 133 modulates the additional data (M_data) together with the TDM Pilot 1 data and outputs the modulated data to the subcarrier mapper 141.

The data rate of the additional data (M_data) can be determined with reference to table 1.

TABLE 1

| OFDM symbol | Number of allocated subcarriers | Number of unallocated subcarriers | Number of bits with QPSK | Number of bits with 16QAM |
|---|---|---|---|---|
| TDM Pilot 1 | 124 | 3876 | 7752 | 15504 |
| WIC | 500 (slot 3) | 3500 | 7000 | 14000 |
| LIC | 500 (slot 5) | 3500 | 7000 | 14000 |
| TDM Pilot 2 | 2000 (slots 0, 1, 2, 7) | 2000 | 4000 | 8000 |
| Total | 3124 | 12876 | 25752 | 51504 |

Referring to table 1, the TDM Pilot 1 is allocated 124 subcarriers of an OFDM symbol such that 3876 unallocated subcarriers remain. In a case of using quadrature phase-shift keying (QPSK), the unallocated 3876 subcarriers can be used to transmit up to 7752 bits of additional data. In a case of using quadrature amplitude modulation (QAM), the unallocated 3876 subcarriers can be used to transmit 15504 bits of additional data.

The WIC and LIC are each allocated one slot (500 subcarriers) in a respective OFDM symbol duration such that 3500 unallocated subcarriers remain in each OFDM symbol. The unallocated 3500 subcarriers of each OFDM symbol can be used to transmit up to 7000 bits of additional data with QPSK and up to 14000 bits of addition data with 16 QAM.

The TDM Pilot 2 is allocated four slots of an OFDM symbol such that four unallocated slots (2000 subcarriers) remain. Accordingly, the unallocated 2000 subcarriers can be used to transmit up to 4000 bits of additional data with QPSK and up to 8000 bits of additional data with 16 QAM.

That is, the additional data (M_data) can be transmitted using the unallocated subcarriers of the OFDM symbols at 25 Kbps with QPSK modulation scheme and at 50 Kbps with 16 QAM modulation scheme while transmitting the broadcast data in the MediaFLO system.

As described above, the broadcast station 100 of the MediaFLO system according to an exemplary embodiment of the present invention can transmit the additional data (M_data) at 25 Kbps or 50 Kbps in addition to the broadcast data. The data rate of the additional data (M_data) can be increased or decreased depending on the modulation scheme applied therefor.

Figure 6:
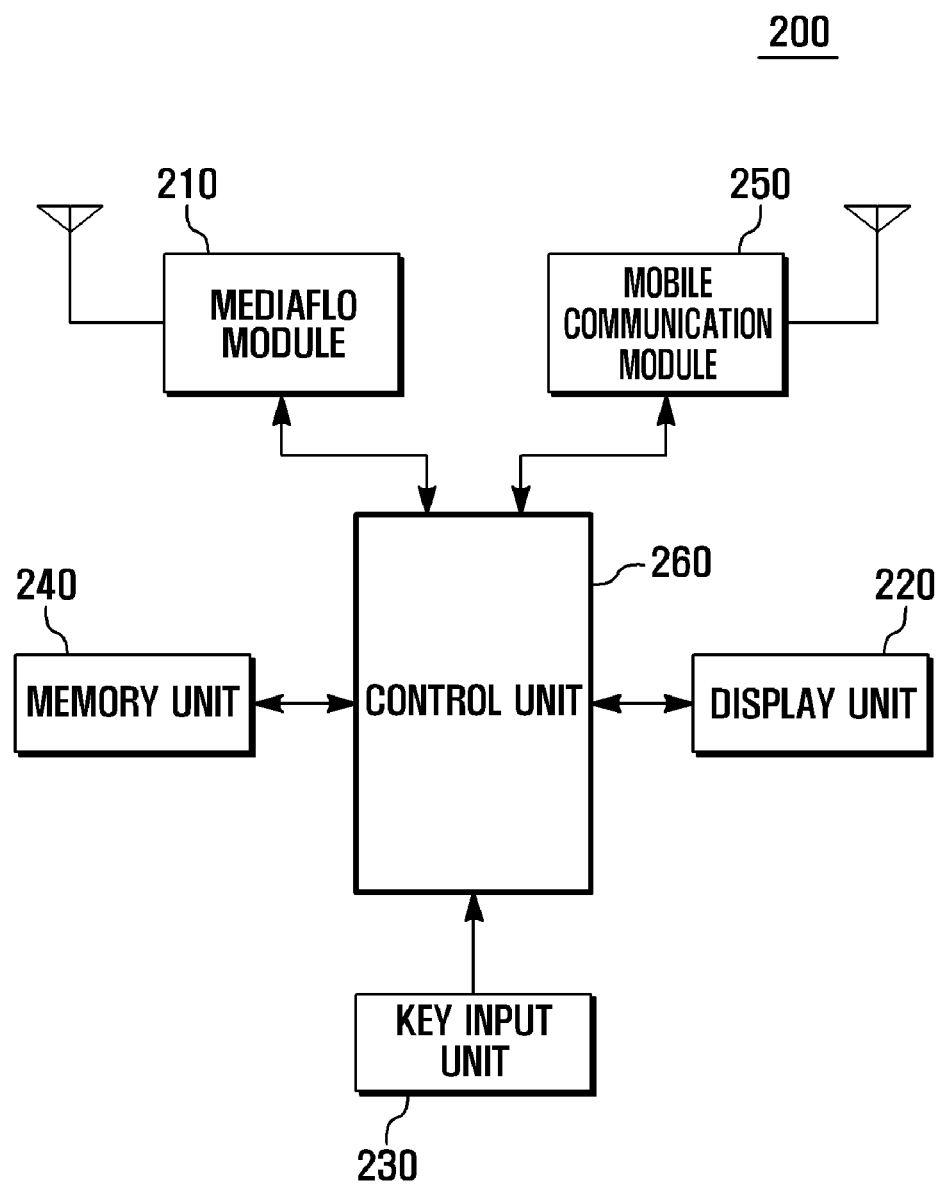
FIG. 6 is a block diagram illustrating a configuration of a mobile terminal according to an exemplary embodiment of the present invention.

FIG. 6 is a block diagram illustrating a configuration of a mobile terminal according to an exemplary embodiment of the present invention.

The mobile terminal 200 receives and displays the broadcast data and the additional data (M_data) broadcast by the broadcast station 100. Referring to FIG. 6, the mobile terminal 200 includes a MediaFLO module 210, a display unit 220, a key input unit 230, a memory unit 240, and a control unit 260. If the mobile terminal 200 is implemented as a mobile phone, it may include a mobile communication module 250 and an audio processing unit for processing audio data included in the broadcast data and additional data (M_data).

The MediaFLO module 210 is responsible for receiving the broadcast data and the additional data (M_data) broadcast by a broadcast station. The MediaFLO module 210 is implemented with components arranged in inverse order of transmission components of the broadcast station so as to demodulate and decode the broadcast data and the additional data broadcast by the broadcast station. The MediaFLO module 210 processes the broadcast data and the additional data and transfers the processed data to the control unit 260 such that the control unit 260 outputs the broadcast data and the additional data through the display unit 220.

The display unit 220 displays the broadcast data in the form of a visual image and presents the additional data selectively in accordance with its attributes. That is, the additional data (M_data) having a visual attribute is overlappingly presented on the broadcast data or at an area of a screen of the display unit 220. The display unit 220 can be implemented with a Liquid Crystal Display (LCD) and, in this case, the display unit 220 may also function as an input means.

The key input unit 230 is provided with a plurality of alphanumeric keys for receiving alphanumeric data and function keys for executing various functions of the mobile terminal 200. The function keys may include navigation keys, side keys, and shortcut keys. The key input unit 230 receives key input and transfers key signals corresponding to the key input to the control unit 260.

The memory unit 240 stores an operating system and application programs required for operating various functions provided by the mobile terminal 200. The memory unit 240 also stores the broadcast data and the additional data (M_data) received by the MediaFLO module 210. The memory unit 240 may include a program region and a data region.

The program region stores the operating system (OS) for booting up the mobile terminal 200 and application programs required for processing and reproducing the broadcast data that are encoded and modulated in the frames of MediaFLO system. For example, programs for executing other multimedia functions such as a camera function, an audio playback function, a video playback function, and a videoconference function. The program region also stores applications associated with reproduction of the additional data (M_data). For example, the application can be a message processing application for processing additional data (M_data) of the message type. The mobile terminal 200 executes, when a specific function is requested, the applications associated with the function under the control of the control unit 260.

The data region stores application data generated while the mobile terminal 200 operates with the application programs for executing corresponding functions and user data input by the user. The application data and user data may include images taken with the camera function, audio and video data, phonebook data, and various downloaded content. The data region also stores the broadcast data and the additional data received through the media flow module 210.

The control unit 260 controls general operations of the mobile terminal 200 and signaling between its internal components. In the case of the control unit 260 equipped with a mobile communication function, the control unit 260 may incorporate a modem and a codec for processing audio and video data.

In an exemplary embodiment, the control unit 260 controls the receiving of the broadcast data and the additional data (M_data) broadcast by the broadcast station 100, the transferring of the broadcast data to the display unit 220, and the processing of the additional data in association with a corresponding function. Since the additional data (M_data) is mapped to the TDM Pilot region, the control unit 260 controls such that the MediaFLO module 210 demodulates and decodes the received broadcast signal and inspects the TDM Pilot region for detecting the additional data (M_data). If the additional data (M_data) is detected in the TDM Pilot region, the control unit 260 extracts the additional data from the TDM Pilot region so as to be stored within the memory unit 240 and/or displayed through the display unit 220. In a case that the additional data (M_data) is mapped to another region but not to the TDM Pilot region including WIC, LIC, TDM Pilot 1, and TDM Pilot 2, the broadcast station 100 may insert an indicator, e.g. a flag, for indicating the existence of the additional data (M_data) into a specific part of the TDM Pilot 1 region in order for the mobile terminal 200 to facilitate detecting the existence of the additional data (M_data). In a case that the additional data (M_data) is a message, the control unit 260 controls such that the message is displayed on a message screen. In a case that the additional data (M_data) is terminal update information, the control unit 260 performs an update of the mobile terminal 200 using the additional data (M_data).

The mobile communication module 250 is an additional component when the mobile terminal 200 is implemented as a mobile phone. The mobile communication module 250 is responsible for transmitting and receiving voice and data including video data in a communication session.

As described above, a mobile terminal according to an exemplary embodiment of the present invention extracts the additional data (M_data) broadcast by a broadcast station together with the broadcast data and processes the additional data (M_data) so as to be stored within the memory unit 240 and/or presented in an appropriated manner.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims and their equivalents.

As described above, the method and apparatus for transceiving data according to exemplary embodiments of the present invention enables transmitting additional data through unallocated regions of a super frame, thereby reducing any waste of resources and improving resource utilization efficiency.

What is claimed is:

1. A data transmission apparatus comprising:
   a frame generator for generating a broadcast frame including a first region for containing broadcast data and a second region for containing additional data; and
   a transmitter for encoding, modulating, and transmitting the broadcast frame, the transmitter comprising a slot allocator for allocating slots to the broadcast data and the additional data,
   wherein the broadcast frame comprises a time division multiplexing pilot (TDM Pilot) region for synchronizing receipt of the broadcast frame, the TDM Pilot region comprising a TDM Pilot 1, a wide-area identification channel (WIC), a Local-area indication channel (LIC), and a TDM Pilot 2 that are each designated to distinctive individual orthogonal frequency division multiplexing (OFDM) symbols, each OFDM symbol including eight slots, and further wherein the slot allocator allocates unallocated slots of the WIC, LIC, and TDM Pilot 2 to the additional data.

2. The data transmission apparatus of claim 1, wherein the broadcast frame further comprises:
   an overhead information symbols (OIS) region for containing system parameters; and
   a data region for containing the broadcast data.

3. The data transmission apparatus of claim 1, wherein the TDM Pilot 1 comprises 248 bits.

4. The data transmission apparatus of claim 1, wherein each of the WIC and LIC is allocated one slot for carrying the broadcast data and seven slots for carrying the additional data.

5. The data transmission apparatus of claim 1, wherein the TDM Pilot 2 is allocated four slots for carrying the broadcast data and four slots for carrying the additional data.

6. The data transmission apparatus of claim 1, wherein the transmitter further comprises:
   a modulation bit mapper for mapping bits of the data to modulation symbols.

7. The data transmission apparatus of claim 6, wherein the modulation bit mapper maps data of the TDM Pilot 1 and the additional data to the broadcast frame.

8. The data transmission apparatus of claim 1, wherein the transmitter broadcasts the broadcast data and the additional data using a MediaFLO method.

9. A data reception apparatus comprising:
   a broadcast reception module for receiving a broadcast frame; and
   a control unit for extracting broadcast data and additional data from the broadcast frame and for processing, when the additional data is detected, the additional data independently,
   wherein the broadcast frame comprises a time division multiplexing (TDM) region and the additional data is carried by the TDM pilot region, the TDM pilot region comprises a TDM Pilot 1, a wide-area identification channel (WIC), a Local-area indication channel (LIC), and a TDM Pilot 2 that are each designated to distinctive individual orthogonal frequency division multiplexing (OFDM) symbols, each OFDM symbol including eight slots, and further wherein the additional data is allocated to unallocated slots of the WIC, LIC, and TDM Pilot 2.

10. The data reception apparatus of claim 9, further comprising:
    a display unit for displaying the broadcast data;
    an audio processing unit for processing audio data included in the broadcast data; and
    a memory unit for storing the broadcast data and the additional data.

11. The data reception apparatus of claim 9, wherein the broadcast reception module comprises a MediaFLO module.

12. The data reception apparatus of claim 9, wherein the TDM Pilot 1 comprises 248 bits.

13. The data reception apparatus of claim 9, wherein each of the WIC and LIC is allocated one slot for carrying the broadcast data and seven slots for carrying the additional data.

14. The data reception apparatus of claim 9, wherein the TDM Pilot 2 is allocated four slots for carrying the broadcast data and four slots for carrying the additional data.

15. A data transceiving apparatus comprising:
    a data transmitter for encoding, modulating, and transmitting a broadcast frame including a first region containing broadcast data and a second region containing additional data, wherein the data transmitter comprises a slot allocator for allocating slots to the broadcast data and the additional data; and
    a data receiver for receiving the broadcast frame, for extracting at least any of the broadcast data and the additional data from the broadcast frame, and for processing the broadcast data and the additional data independently,
    wherein the broadcast frame comprises a time division multiplexing pilot (TDM Pilot) region for synchronizing receipt of the broadcast frame, the TDM Pilot region comprises a TDM Pilot 1, a wide-area identification channel (WIC), a Local-area indication channel (LIC), and a TDM Pilot 2 that are each designated to distinctive individual orthogonal frequency division multiplexing (OFDM) symbols, each OFDM symbol including eight slots, and further wherein the slot allocator allocates unallocated slots of the WIC, LIC, and TDM Pilot 2 to the additional data.

16. The data transceiving apparatus of claim 15, wherein the broadcast frame further comprises:
- an overhead information symbols (OIS) region for containing system parameters;
- a data region for containing the broadcast data; and
- a reserved region for containing location information.

17. The data transceiving apparatus of claim 15, wherein TDM Pilot 1 comprises 248 bits.

18. The data transceiving apparatus of claim 15, wherein each of the WIC and LIC is allocated one slot for carrying the broadcast data and seven slots for carrying the additional data.

19. The data transceiving apparatus of claim 15, the TDM Pilot 2 is allocated four slots for carrying the broadcast data and four slots for carrying the additional data.

20. The data transceiving apparatus of claim 15, wherein the data transmitter further comprises:
- a modulation bit mapper for mapping bits of the data to modulation symbols.

21. The data transceiving apparatus of claim 20, wherein the modulation bit mapper maps data of the TDM Pilot 1 and the additional data to the broadcast frame.

22. The data transceiving apparatus of claim 15, wherein the data receiver comprises:
- a broadcast reception module for receiving a broadcast frame;
- a control unit for extracting broadcast data and additional data from the broadcast frame and for processing, when the additional data is detected, the additional data independently;
- a display unit for displaying the broadcast data;
- an audio processing unit for processing audio data included in the broadcast data; and
- a memory unit for storing the broadcast data and additional data.

23. The data transceiving apparatus of claim 22, wherein the broadcast reception module comprises a MediaFLO module.

* * * * *